United States Patent [19]

Toome

[11] 4,099,696
[45] Jul. 11, 1978

[54] SUPPORT APPARATUS

[75] Inventor: Edward James Toome, Maidstone, England

[73] Assignee: Elliott Brothers (London) Limited, Chelmsford, England

[21] Appl. No.: 771,902

[22] Filed: Feb. 25, 1977

[30] Foreign Application Priority Data

Mar. 10, 1976 [GB] United Kingdom ............... 9610/76

[51] Int. Cl.² ............................................ F16F 15/04
[52] U.S. Cl. ................................. 248/358 R; 74/5.5; 248/22
[58] Field of Search ............... 248/15, 18, 20, 21, 248/22, 358 R, 358 A, 358 AA; 267/113; 74/5 F, 5.4, 5.5

[56] References Cited

U.S. PATENT DOCUMENTS

| 2,099,375 | 11/1937 | Seward | 248/20 X |
|---|---|---|---|
| 2,365,421 | 12/1944 | Lord | 248/358 R X |
| 2,685,425 | 8/1954 | Wallerstein | 248/22 X |
| 3,088,062 | 4/1963 | Hudimac | 248/358 X |
| 3,545,706 | 12/1970 | Harshman | 248/21 X |
| 3,565,386 | 2/1971 | Lemkuil et al. | 248/358 R |
| 3,703,999 | 11/1972 | Forys et al. | 248/20 |
| 3,865,340 | 2/1975 | Ellis | 248/399 |
| 3,871,778 | 3/1975 | Schulte et al. | 248/163 X |
| 3,904,163 | 9/1975 | Kendy et al. | 248/358 R |
| 3,921,039 | 11/1975 | Robinson et al. | 248/358 R X |

FOREIGN PATENT DOCUMENTS

| 788,874 | 7/1968 | Canada | 248/20 |
|---|---|---|---|
| 565,680 | 12/1932 | Fed. Rep. of Germany | 248/20 |
| 543,917 | 3/1942 | United Kingdom | 248/22 |

Primary Examiner—Lawrence J. Staab
Attorney, Agent, or Firm—Kirschstein, Kirschstein, Ottinger & Cobrin

[57] ABSTRACT

Apparatus for supporting a first structure on a second structure so that relative movement between the two structures is permitted in three mutually perpendicular directions only comprises three flexible shafts connected between the first structure and the second structure and mutually inclined so that their axes of torsional restraint intersect at a position at or relatively close to the center of mass of the first structure and a load carried by the first structure. The apparatus may include damping means connected between the first and second structures to provide a vibration and shock isolating arrangement and lying in a common plane which includes the center of mass of the first structure and a load carried by the first structure.

10 Claims, 4 Drawing Figures

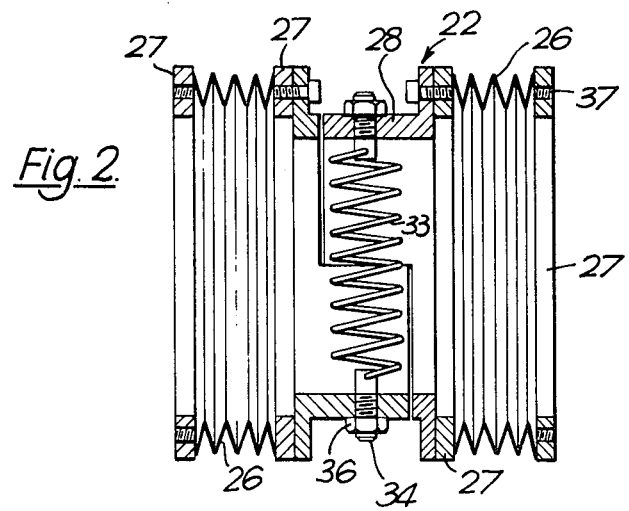
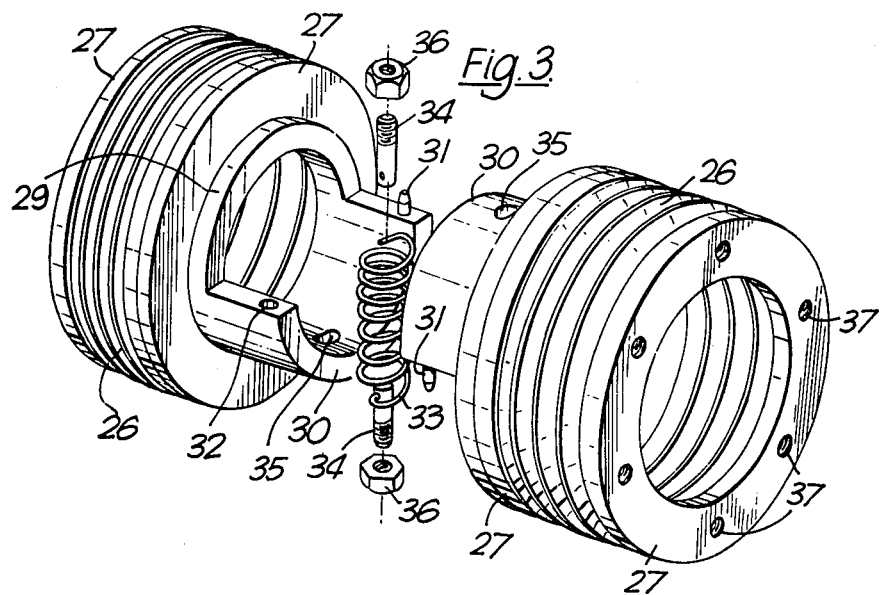
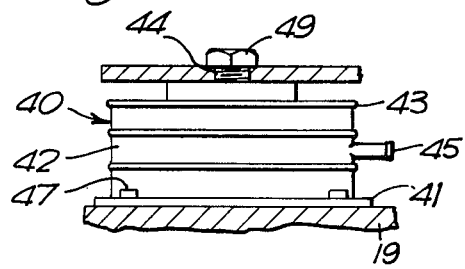

SUPPORT APPARATUS

This invention relates to apparatus for supporting a first structure on a second structure so that relative movement between the two structures is permitted in three mutually perpendicular directions only, i.e. relatively rotary movement is prevented.

According to the present invention an apparatus for supporting a first structure on a second structure so that relative movement between the two structures is permitted in three mutually perpendicular directions only, comprises three flexible shafts connected between the first structure and the second structure and mutually inclined so that their axes of torsional restraint intersect at a position at or relatively close to the centre of mass of the first structure and a load carried by the first structure.

The apparatus may include damping means connected between the first and second structures to provide a vibration and shock isolating arrangement.

Such damping means preferably comprises at least three damping units arranged in a common plane which includes the centre of mass of the first structure and a load carried by the first structure.

Preferably each of the flexible shafts has two tubular end portions formed by flexible bellows and coupled to each other by two tubular members having co-operating semi-cylindrical end portions. The two semi-cylindrical end portions may be urged into engagement by spring means arranged to permit the two semi-cylindrical end portions to move apart when a predetermined torsional force is applied to the flexible shaft. In this way rupture of the bellows by excessive torsional forces is avoided.

The invention will now be described, by way of example, with reference to the accompanying drawings in which:

FIG. 2 is a sectional side elevation of one of the flexible shafts shown in FIG. 1;

FIG. 3 is an exploded perspective view of one of the flexible shafts shown in FIG. 1; and FIG. 4 is a sectional side elevation of an antivibration unit shown in FIG. 1.

Figure 1:
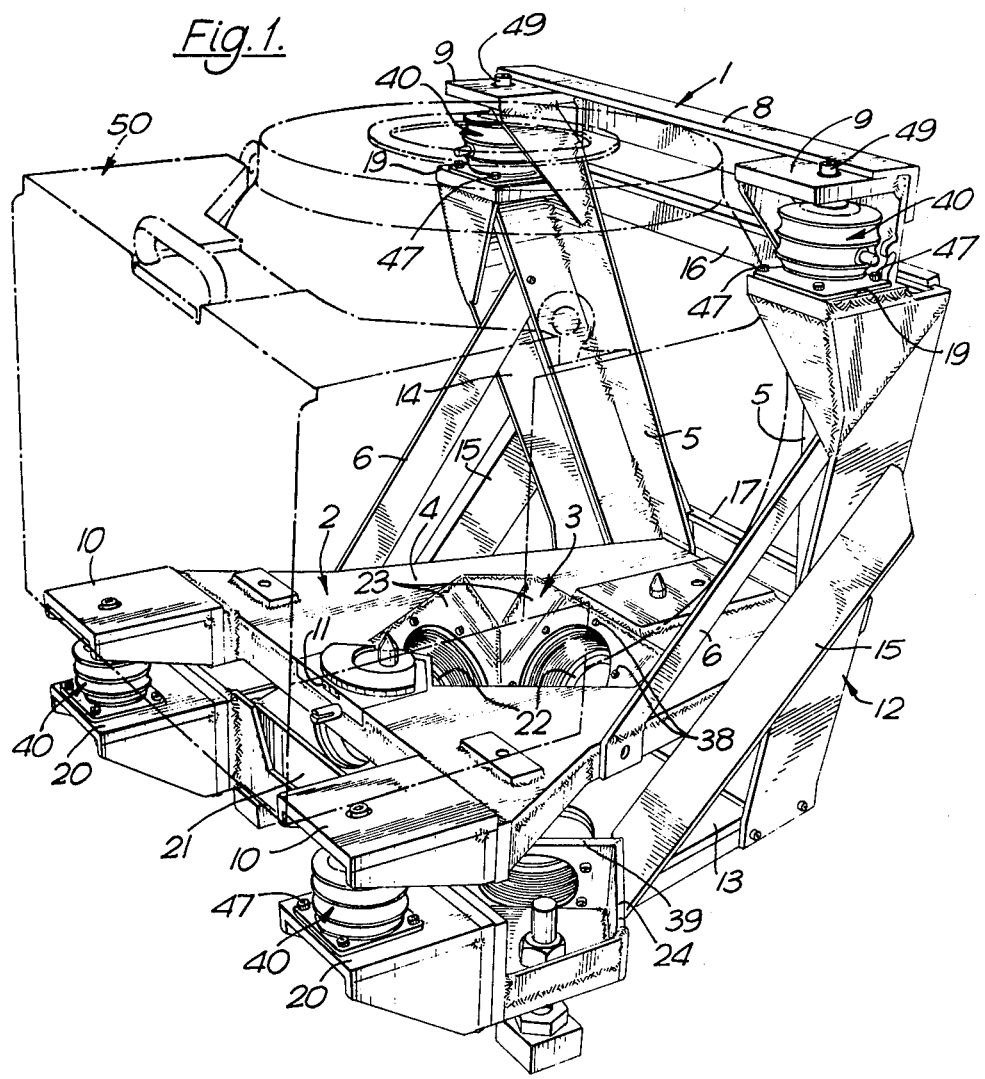
FIG. 1 is a perspective view of a support apparatus in accordance with the invention.

Referring to the drawings, the support apparatus includes a first structure 1, of aluminium, formed by a substantially horizontal tray or platform 2 having a generally triangular well 3 in its upper surface 4 and two members 5, of L-shaped cross-section, which extend upwards and forwards from the rear corners of the platform 2. The two members 5 are rigidly held in this position by respective bracing members 6 each of which extends between a position near the top of its associated member 5 and a position part way along the adjacent side of the platform 2, and by a further bracing member 8, of L-shaped cross-section, which extends between the upper ends of the members 5. The upper end of each member 5 has secured thereto a horizontally extending plate 9, and two further horizontally extending plates 10 are secured to the front end 11 of the platform, one plate 10 at each extremity.

The support apparatus also includes a second structure 12, also of aluminium, formed by a cradle or base 13 having two members 14, of L-shaped cross-section which extend upwards and forwards from the rear corners of the base 13. The members 14 are rigidly held in this position by respective bracing members 15 each of which extends between a position part way up its associated member 14 and a position part way along the adjacent side of the base 13, and by two further bracing members 16 and 17 which respectively extend between the upper and lower ends of the members 14 parallel to the rear end of the base 13. The upper end of each member 14 has secured thereto a horizontally extending plate 19, and two further horizontally extending plates 20 are secured to the front end 21 of the base 13, one plate 20 at each extremity.

The first structure 1 is constrained on the second structure 12 with the platform 2 above the base 13 by three flexible shafts 22 each of which extends between an inclined side 23 of the well 3 and a co-operating bracket 24 mounted on the base 13. The three flexible shafts 22 are mutually perpendicular and positioned so that their axes of torsional restraint intersect at, or relatively close to, the combined centre of mass of the first structure 1 and a load which is to be carried thereby.

As can be seen in FIGS. 2 and 3 each flexible shaft 22 has two tubular end portions each formed by a flexible bellows 26 of stainless steel secured between annular end plates 27 of metal. The axially inner end plates 27 are coupled together by a hollow shaft 28 formed by two tubular members 29 having co-operating semi-cylindrical end portions 30. An upstanding stud 31 on each of the semi-cylindrical end portions 30 is located in a recess 32 in the other, the two semi-cylindrical end portions being urged into engagement with each other by a tension spring 33 which extends diametrically across the interior of the co-operating tubular members 28. The tension spring 33 is secured in position by pins 34 which pass through holes 35 in the semi-cylindrical end portions 30 and are secured by nuts 36. The axially outer end plates 27 are provided with a plurality of tapped holes 37 into which are screwed bolts 38 which secure these end plates 27 to an inclined side 23 of the well 3 and to a correspondingly inclined side 39 of a bracket 24.

Supporting the first structure 1 on the second structure 12 are four anti-vibration units 40, two of which are interposed between the plates 9 and 19 at the upper ends of the two structures and the other two of which are interposed between the plates 10 and 20 at the front end of the platform 2 and base 13. As can be seen in FIG. 4, which shows one of the anti-vibration units 40 at the upper end of the two structures 1 and 13, each unit 40 comprises a metal mounting plate 41 on which is mounted an inflatable rubber cylinder 42 having a diaphragm 43 at its upper end from which extends a mounting bolt 44. A valve 45 provided on the side of the bellows 42 enables the cylinder to be inflated to a suitable pressure. The mounting plate 41 is provided with holes through which bolts 47 extend to secure the mounting plate 41 to the plate 19. The mounting bolt 44 at the upper end of the unit 40 extends through a hole in the plate 9 and is secured by a nut 49.

The support apparatus is designed so that when a load, indicated by the chain line 50, is mounted on the structure 1, the axes of torsional restraint of the flexible shafts 22 are inclined so that they intersect at the centre of mass of the structure 1 and the load 50. The antivibration units 40 are also located so that the centres of the diaphragms 43 at the upper ends of the units 40 lie in a common plane which also includes the centre of mass of the structure 1 and the load 50 so that any linear forces applied to the structure 13 do not give rise to angular forces (torques) in the structure 1 and its load 50. To this end the bellows 26 are arranged to be of low radial stiffness and tend to behave as universal couplings. To avoid rupture of the bellows, in the event that exceptionally high torsional forces are applied thereto, the spring 33, is arranged to permit the semi-cylindrical end portions 30 of the co-operating tubular members 29 to move apart when such torsional forces reach a predetermined value. The antivibration units 40 ensure that vibration and shock applied to the structure 13 is isolated from the first structure 1.

The support apparatus of the invention is particularly suitable for providing an angularly stable support for a gyro platform in a hovercraft or a sea-going vessel, in which large linear displacements can occur due to shock conditions. When intended for use in such an environment the resonant frequency of the system would be arranged to be below the frequencies of the vibrations which occur in the environment, typically, in the case of a sea-going vessel or hovercraft, vibrations in the frequency band 15 Hz to 20 Hz such as may be produced by the engines and other equipment.

I claim:

1. Apparatus for supporting a first structure on a second structure so that relative movement between the two structures is permitted in three mutually perpendicular directions only, comprising:
   (a) a first structure;
   (b) a second structure on which the first structure is supported;
   (c) three flexible shafts connected between the first structure and the second structure and mutually inclined so that their axes of torsional restraint intersect at a position at or relatively close to the centre of mass of the first structure and a load carried by the first structure; and
   (d) damping means comprising at least three damping units connected between the first and second structures to provide a vibration and shock isolating arrangement and arranged in a common plane which includes the centre of mass of the first structure and a load carried by the first structure.

2. Apparatus as claimed in claim 1, wherein a flexible shaft has two tubular end portions formed by flexible bellows and coupled to each other by two tubular members having co-operating semi-cylindrical end portions.

3. Apparatus as claimed in claim 2, wherein the two semi-cylindrical end portions are urged into engagement by spring means arranged to permit the two semi-cylindrical end portions to move apart when a predetermined torsional force is applied to the flexible shaft.

4. Apparatus as claimed in claim 1, wherein the first structure includes a platform having a generally triangular well with inclined sides, and each of the flexible shafts extends between an inclined side of the well and a base lying beneath the platform and forming part of the second structure.

5. Apparatus as claimed in claim 1, wherein the first structure includes a substantially horizontal platform and at least one member extending upwards and forwards from the rear of the platform, and the second structure includes a base lying beneath the platform and at least one member extending upwards and forwards from the rear of the base, the three flexible members extending between the platform and the base.

6. Apparatus as claimed in claim 5, wherein the damping units are connected between the platform and the base and between the members extending respectively from the rear of the platform and the rear of the base.

7. Apparatus as claimed in claim 5, wherein the damping means comprise two damping units connected between the front of the platform and the front of the base and at least one further damping unit connected between an upper end of a member extending from the rear of the platform and an upper end of a member extending from the rear of the base.

8. Apparatus as claimed in claim 1, wherein the first structure includes a platform and two members extending upwards from the rear of the platform, and the second structure includes a base lying beneath the platform and two members extending upwards from the rear of the base, the three flexible members extending between the platform and the base, and also wherein two damping units are connected between the front of the platform and the front of the base and two further damping units connected between the upper end of the members extending from the rear of the platform and the upper ends of the members extending from the rear of the base.

9. Apparatus for supporting a first structure on a second structure so that relative movement between the two structures is permitted in three mutually perpendicular directions only, comprising:
   (a) a first structure;
   (b) a second structure on which the first structure is supported;
   (c) three flexible shafts connected between the first structure and the second structure and mutually inclined so that their axes of torsional restraint intersect at a position at or relatively close to the centre of mass of the first structure and a load carried by the first structure;
   (d) each flexible shaft having two tubular end portions formed by flexible bellows and coupled to each other by two tubular members having cooperating semi-cylindrical end portions.

10. Apparatus as claimed in claim 9, wherein the two semi-cylindrical end portions are urged into engagement by spring means arranged to permit the two semi-cylindrical end portions to move apart when a predetermined torsional force is applied to the flexible shaft.

* * * * *